A. NICOL.
SYSTEM FOR RECORDING THE CONDITION OF APPARATUS.
APPLICATION FILED FEB. 11, 1913.
1,240,763.
Patented Sept. 18, 1917.
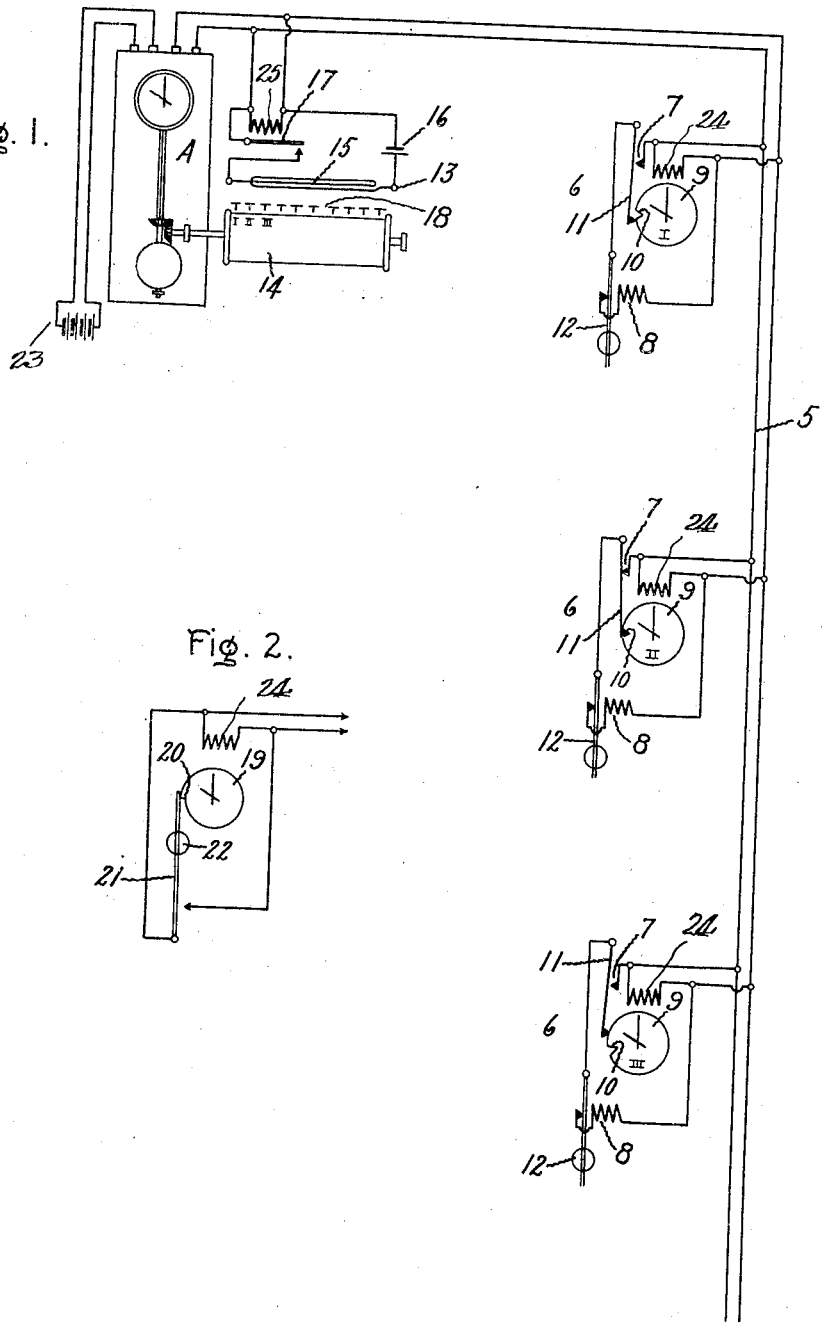

UNITED STATES PATENT OFFICE.

AUGUST NICOL, OF NIEDER-SCHÖNHAUSEN, GERMANY, ASSIGNOR TO GENERAL ELECTRIC COMPANY, A CORPORATION OF NEW YORK.

SYSTEM FOR RECORDING THE CONDITION OF APPARATUS.

1,240,763.  Specification of Letters Patent.  Patented Sept. 18, 1917.

Application filed February 11, 1913. Serial No. 747,707.

*To all whom it may concern:*

Be it known that I, AUGUST NICOL, a subject of the King of Prussia, residing at Nieder-Schönhausen, Germany, have invented certain new and useful Improvements in Systems for Recording the Condition of Apparatus, of which the following is a specification.

My invention relates to a system for recording the condition of operating apparatus, and is particularly adapted to be employed in connection with synchronously operating devices, such, for example, as electric clocks. The object of my invention is to provide a system whereby the condition of operation of an apparatus or a plurality of apparatus may be indicated at a convenient station so that an operator at such station can tell how much apparatus is or are, as the case may be, operating. My invention is particularly useful in connection with synchronously operating devices, such as electric clocks.

In systems heretofore used for controlling in large clock systems the individual secondary clocks for synchronous operation with a master clock, complicated connections and transmitting apparatus have been necessary. Moreover the devices heretofore employed are characterized by a further disadvantage in that, while an indication is given when a clock operates incorrectly, yet there is provided no means for determining the degree of incorrectness of such clock. My present invention provides a system in which not only the incorrect operation of the apparatus is indicated at a central station, but also one in which the degree of incorrectness in such operation is also indicated and recorded.

The novel features which I believe to be characteristic of my invention will be definitely indicated in the claims appended hereto. The features of construction and mode of operation will be understood by reference to the following description taken in connection with the accompanying drawings which show a preferred embodiment of my invention, and in which Figure 1 is a diagrammatic view illustrating the novel features of my invention embodied in an electric clock, and Fig. 2 is a diagrammatic view showing a modified construction of actuator for the individual secondary clocks.

In Fig. 1 of the drawings I have illustrated an electric clock system having three secondary clocks I, II and III controlled by and operated from a master clock A. The master clock A operates the secondary clocks I, II and III by current impulses sent out over the electric circuit 5 in the usual and well understood manner therefor. As shown in the drawings, these current impulses are derived from a battery 23, and are adapted to energize magnet coils 24 of each secondary clock, whereby the secondary clock mechanisms are actuated in the usual manner. The current impulses may be produced at intervals of one minute as is usually the case, or at any other desired intervals.

Each of the secondary clocks I, II and III is provided with an actuator 6 by means of which an electric current of a definite period may be sent out over the circuit 5 to the central station where the master clock A is located. As shown in Fig. 1 of the drawings, each actuator comprises a circuit closer 7 and a circuit interrupter 8. The circuit closer of each actuator is operated by a rotating disk 9 driven by the mechanism of its associated secondary clock.

In the construction illustrated in the drawings each disk 9 is provided with a notched portion 10 with which the spring contact arm 11 of the circuit closer coöperates. It will be apparent from the drawings that when the arm 11 drops into its coöperating notch 10 that the circuit closer completes a circuit through the circuit interrupter 8. It will be noticed from the drawings that the operation of the circuit closer 7 is arranged to take place at different times so that no interference will be occasioned by the simultaneous operation of the actuators of two or more clocks.

The circuit interrupters illustrated in the drawings comprise an electromagnet member which attracts an interrupting armature, and thereby interrupts the electric circuit. The number of periods or interruptions of the electric circuit is adjusted by means of the oscillatory spring member 12. It will be understood that each circuit interrupter is adjusted to send out over the electric circuit 5 currents of different periods, that is, the interrupter for clock I will have a definite factor of interruption, whereas the interrupter for clock 2 will have a different factor of interruption.

A recorder 13 is provided at the central station. This recorder comprises a time actuated record drum 14, which may have operatively secured thereto the usual record sheet, and in operative relation with said time actuated record drum a device 15 selectively responsive to electric currents of different periods. This selectively responsive device is connected to the circuit 5 through a battery 16 and an electromagnet circuit closer 17. The circuit closer 17 has a coöperating magnet coil 25 adapted to be energized when the current impulses controlled by the master clock are sent over the system. Normally the magnet coil 25 is unenergized and the circuit closer 17 completes an electric circuit through the device 15. When the magnet coil 25 is energized the circuit closer 17 operates to open this circuit during the period that the current impulse is being sent over the system. The selectively responsive device 15 is provided with tongues, diagrammatically indicated by a reference character 18, which are adapted to impart a record on the time actuated record sheet when a current flows through the device 15 corresponding to the period for which the particular tongue is tuned to respond.

In operating my novel system the rotating disks 9 of each clock are arranged to operate the circuit closers 7 at a predetermined time, as indicated by the individual clocks. As previously mentioned, these predetermined times are different for the different clocks. In the drawings the circuit closer 7 of clock 2 is shown as just operated by the disk 9. When the circuit closer 7 is thus operated current is sent through the interrupter 8, circuit 5 and the device 15 by means of the battery 16. The interrupter 8 will oscillate at its predetermined period and send the current of such period through the device 15. Thereupon the tongue 18 of this device which responds to this particular period will be vibrated and will impart a record on the registering cylinder or recording drum 14. From the record which is thus imparted to the record sheet the variance between the time as indicated by the secondary clock and the actual time as determined by the master clock can be determined, and thus the degree of incorrectness in the indication of the secondary clock is readily obtained.

The coil 25 of the circuit closer 17 is similar in design to the coils 24 and is energized to the degree necessary to attract its armature whenever the coils 24 are so energized. The circuit closer 17 therefore operates to cut the selectively responsive device 15 out of circuit whenever the main current impulses for actuating the secondary clock mechanisms are being sent over the system. As indicated in the drawings, the battery 23 for actuating the secondary clock mechanisms is considerably stronger than the battery 16 in the circuit of the device 15. The voltage of the battery 16 is not large enough to send a current through the coils 24 and 25 of sufficient strength to energize these coils to the degree necessary to attract their respective coöperating armatures. It therefore follows that the intermittent current sent over the system by the closing of the circuit closer 7 of any secondary clock is too weak to operatively energize the coils 24 and 25.

In the example illustrated in the drawings it is assumed that an indication is given by the secondary clocks to the master clock only once during the revolution of the disk 9. The system may obviously be so designed, however, that the indication is given at shorter intervals, for example, every one-quarter hour. To this end it is only necessary to increase the number of incisions or notches 10 in the disk 9.

In Fig. 2 I have illustrated a modified construction of actuator wherein the number of oscillations of the circuit interrupter is regulated mechanically. The clock mechanism drives a cam 19 which is provided with a notch 20. A spring member 21 provided with a weight 22 coöperates with the cam and serves the dual functions of circuit closer and circuit interrupter performed by the actuators described in connection with Fig. 1. When the cam rotates so that the spring member 21 drops into the notched portion 20, the spring member is caused to vibrate according to a definite period as determined by the position of the weight 22. In its vibration the spring member is arranged to periodically close the circuit and thus produce a current of characteristic period for this particular clock.

Although I have described my invention with particular reference to its application to a system of electric clocks, it will be evident that the invention is in no sense limited to this one application. On the other hand, my invention is adapted to be used in connection with any apparatus wherein it is desired to indicate at a central station the condition of operation of such apparatus. It will, of course, be evident that my invention is particularly adapted to be used where it is desired to indicate the condition of operation of a plurality of apparatus. I do not, therefore, desire to be limited to the particular application and specific construction illustrated and described, but aim in the appended claims to cover my invention broadly and all modifications thereof.

What I claim as new and desire to secure by Letters Patent of the United States, is,—

1. A system of the character described comprising a plurality of apparatus each of which has a movable element, means normally operating to synchronously move each of said movable elements, an actuator having a circuit interrupter associated with each apparatus and arranged to be operated when the synchronously moving element of its associated apparatus occupies a predetermined position, the circuit interrupters of the actuators being adjusted to oscillate at different periods, a recorder having a time actuated record sheet, means selectively responsive to electric currents of different periods operatively related to said record sheet, and means electrically connecting each actuator to said recorder.

2. A system of the character described comprising a plurality of secondary clocks, a master clock, means controlled by said master clock for operating said secondary clocks, an actuator associated with each secondary clock, each actuator having a circuit closer operated by its secondary clock mechanism, a circuit interrupter, the circuit closers of the different actuators being arranged to normally operate at different times and the circuit interrupters of different actuators being adjusted to oscillate at different periods, a recorder having a time actuated record sheet, and means selectively responsive to electric currents of different periods operatively related to said record sheet, and means electrically connecting each actuator to said recorder.

In witness whereof, I have hereunto set my hand this 23rd day of January, 1913.

AUGUST NICOL.

Witnesses:
   Dr. Ing. Schmiedel,
   Dr. Ing. B. Oldiges.

Copies of this patent may be obtained for five cents each, by addressing the "Commissioner of Patents, Washington, D. C."